INVENTOR,
LESTER P. MOORE

# United States Patent Office 3,322,411
Patented May 30, 1967

3,322,411
GAS AND LIQUID CONTACT APPARATUS
Lester P. Moore, P.O. Box 1762,
Corpus Christi, Tex. 78403
Filed Mar. 29, 1965, Ser. No. 443,334
4 Claims. (Cl. 261—96)

This invention relates to improvements in gas and liquid contact apparatus.

Since the improvements of the invention find particular utility in gas and liquid contact apparatus of the type adapted for use in separating or removing moisture from petroleum gas, it is found convenient to describe the invention herein as employed for such use. However, it is to be recognized that the invention is by no means restricted to this specific use, but is also adapted for various other uses, as for instance in a gas desulphurizing process or the like.

In the prior art, it is customary to dehydrate wet gas by passing the same upwardly through an absorber tower containing bubble trays or packings and to cause a downward gravity flow of a suitable desiccant such as glycol which is thus contacted with the gas to remove moisture therefrom, following which the saturated glycol is removed from the bottom of the tower, regenerated and recirculated. The absorber tower in such case involves a massive and quite expensive structure as well as one which is capable of operating only at comparatively low efficiency in proportion to its size and expense.

With these considerations in mind, the present invention contemplates the provision of a comparatively small contact device or apparatus which may be produced at but a fraction of the cost of the usual tower, as aforementioned, and which with respect to its size is capable of operating at a considerably greater efficiency than conventional towers.

In accordance with the invention, the contact apparatus defines a generally horizontally disposed fluid flow passage through which the wet gas and the desiccant liquid are directed and in which they are intimately intermingled in contact with each other. To achieve this end, the flow path is filled with or has interposed therein and therealong a suitable porous material of a type which is chemically inert in the presence of the fluids flowing through the said passage, as for instance a wire mesh.

Such porous material creates an increased intermingling and contact of the gases and liquids, though at the same time apparently possessing the conflicting quality of tending to cause a laminar flow of the liquids and gases such as might interfere with their intimate intermingling. In accordance with the invention, however, this latter undesired quality is eliminated for all practical purposes by the production of turbulence in the fluid flow in such manner as to disrupt and eliminate this tendency toward laminar flow. In the preferred embodiment of the invention such turbulence is caused by forming the flow path with a series of interconnected undulations such as may be produced by alternating oppositely directed baffles or baffle plates. By vertically orienting the undulations, the invention makes use of gravity to retard the upward flow of liquid and thereby to promote its intermingling with the stream of gases and its time of contact with the gas stream.

A further important feature of the invention consists in injecting lean desiccant liquid into the flow path at one or more locations intermediate its ends, and of also withdrawing or draining off saturated desiccant at one or more intermediate locations, to thereby increase the efficiency of the apparatus.

The accompanying drawing and following detailed description are exemplary only but will serve to disclose what is presently contemplated as the best mode of practicing the invention in one of its several possible fields of use. This, of course, will involve details which may be omitted or changed as those skilled in the art will understand, without departing from the spirit of the invention.

Figure 2:
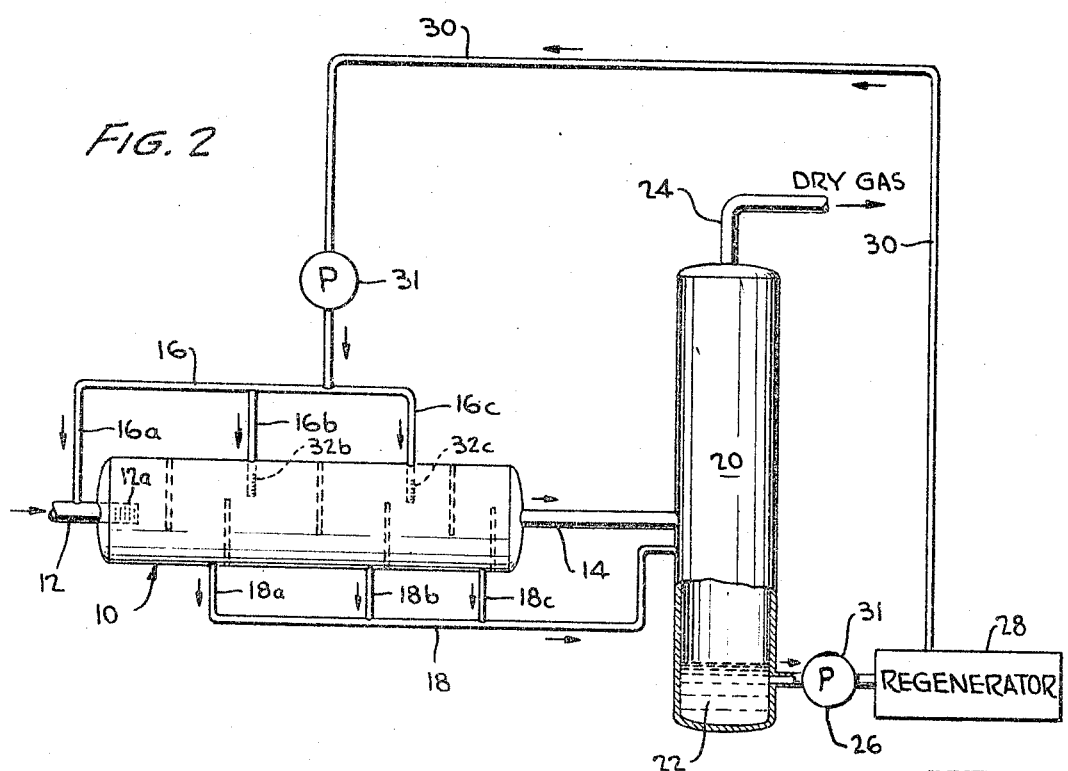
FIGURE 2 is a diagrammatic view of the improved contact apparatus of the invention showing how it may be employed as part of a gas dehydrating system.

Referring now in detail to the accompanying drawing, and first considering the over-all arrangement of parts as illustrated in FIGURE 2, it will be seen that the liquid contact apparatus of the invention is here designated by the numeral 10 and consists of a generally cylindrical casing closed at its ends. The casing has its cylindrical axis disposed substantially horizontally to define a generally horizontally extending fluid flow path therethrough from one end to the other. By means of the conduit 12, a wet or moisture-bearing petroleum gas is delivered from the well or other suitable source into the inlet end of the casing at a pre-determined pressure and velocity. After passing generally horizontally through the casing, it emerges through an outlet or discharge pipe 14, which opens from the casing at a level above its bottom, to thus discourage the discharge of liquid through pipe 14.

During its passage through the contactor 10, the wet gas is subject to the action of a drying agent or desiccant, such as ethylene glycol, which is admitted into the contactor together with the gas, through a conduit 16 having a branch 16a communicating with the conduit 12 adjacent the point of entry of the latter into the contactor 10.

In view of the fact that lean glycol supplied through the supply branch 16a will, in many instances, become saturated before progressing for the full length of the contactor, it is a feature of the invention to supply additional lean glycol to the contactor at relatively-spaced locations 16b and 16c along the contactor, and also preferably to drain off the saturated glycol at suitable locations along the flow path. To this end, the supply line 16, in addition to the branch 16a communicating with the gas inlet 12, is provided with additional branches 16b and 16c communicating with the contactor 10 at points successively downstream thereof. The drain pipe 18 through which the saturated glycol is removed, preferably communicates with the contactor 10 through the bottom thereof by way of branch pipes 18a, 18b, and 18c at locations respectively downstream of the glycol injection points as determined by the locations of the injection pipes 16a, 16b, and 16c.

Since the dry gas which emerges from the contactor 10 through the discharge conduit 14 will normally have a certain amount of partially- or wholly-saturated glycol entrained therein, it is desirable to have the discharge pipe communicate with a separator 20 at a location well above the bottom of the latter so that the entrained glycol may settle out by gravity in the comparatively large volume separator 20 and drop into the lower portion hereof as at 22. The dry gas, after being thus freed of the entrained glycol, emerges from the separator 20 through a discharge line 24 communicating with the upper end of the separator. The line 24 obviously may deliver the dried gas to any desired point of use or to a pipe line, storage tank, or the like.

The saturated desiccant which is drained off through the line 18 is led by that line into the separator 20. To this end the line 18 communicates with the separator 20 at a location above the bottom of the latter so that the discharged saturated glycol may accumulate in the pool 22 in the bottom of the separator. Communicating with the lower end portion of the separator is a drain pipe or conduit 26 for conducting the accumulated saturated glycol 22 to conventional regenerator apparatus, here shown symbolically at 28. It will be understood that such regenerator 28 may be of any type for separating the water from the glycol and then returning the regenerated lean glycol through a return line 30 and pump 31 to the glycol inlet or distribution line 16.

Figure 1:
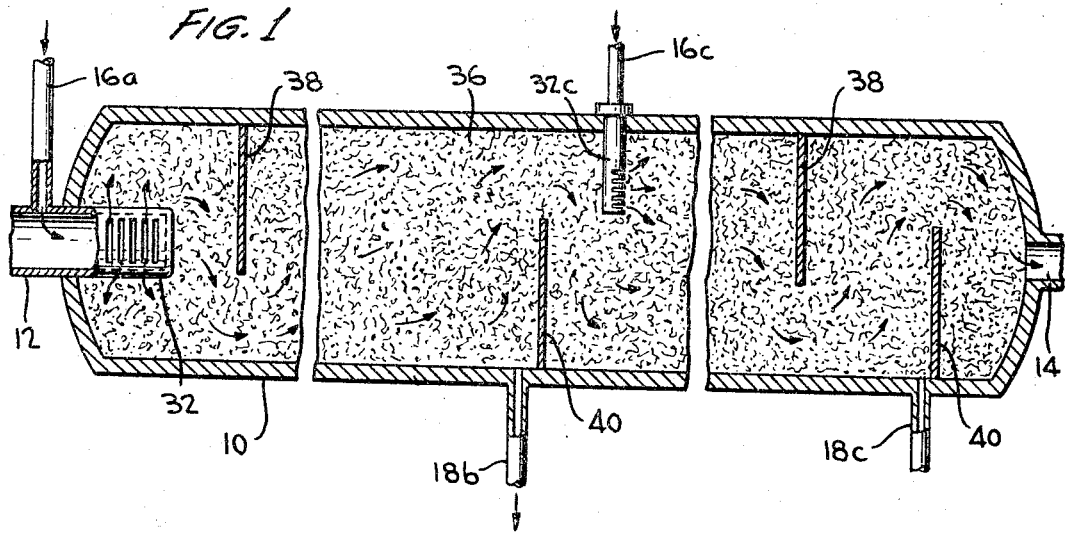
FIGURE 1 is a vertical section through a contact apparatus constructed in accordance with the invention, this view being broken away in part for compactness and showing the fluid inlet and outlet connections fragmentarily.

The organization of elements above described is simply by way of exemplification of one of the several arrangements or systems in which the contactor of the invention may be employed to advantage. Referring now more in detail to the specific features of the contactor 10 per se, as best illustrated in FIGURE 1, it will be seen that the contactor casing 10 defines a generally-horizontal, continuous fluid flow path between the gas inlet 12 and the outlet 14. The inlet pipe or conduit 12 exemplifies a means for introducing a mixture of gases such as petroleum gas and water vapor into the inlet end of the contactor 10. Moreover, the inlet 12 as here employed in conjunction with the desiccant inlet conduit 14a, also constitutes a means for introducing the desiccant such as ethylene glycol into the inlet end of the container. In the preferred embodiment the discharge end of the inlet 12 within the contactor is in the form of a spray nozzle 12a, defined in this instance by a series of radially outwardly opening slots 32 formed through the cylindrical wall of the pipe free end nozzle portion 12a, preferably substantially around the circumference thereof. The axially-directed free end of the nozzle 12a is preferably closed as shown in FIGURE 1, so that the mixture of gas and desiccant liquid is ejected generally radially outwardly through the slots 32 and thoroughly intermingled to thus form a spray-like mixture of gas and liquid. The auxiliary desiccant inlet conduits 16b and 16c also preferably terminate within the contactor 10 in nozzles 32b and 32c respectively, which may be generally similar to the nozzle 12a except that, instead of being slotted on substantially all sides thereof to direct the spray substantially 360 degrees around the axis of the nozzle as in the case of the nozzle 12a, these nozzles 32b and 32c preferably are formed with discharge slots or openings only the downstream side thereof.

For increasing the intimate intermixing of the wet gas and desiccant liquid and increasing the areas of contact between them, the contactor casing 10 is filled with a porous gas and liquid permeable packing 36 of a material which is chemically inert to the substances, namely the gases and liquid, which are treated within the contactor. In the preferred embodiment it has been found that a wire mesh formed of Monel metal functions in a superior manner for this purpose.

It will be apparent that the flow of gas generally longitudinally through the contactor 10 will urge the liquid desiccant in a direction toward the discharge end of the container or contactor, and that much of the liquid desiccant will be caused to cling to the wire mesh where it will be exposed to contact by the gas passing therethrough.

Despite the advantageous functions of the porous packing or filling 36 as above described, it has been found that the advantageous function of the packing in promoting intermingling and increased surface contact between the gas and liquid, in the absence of appropriate counter measures, is offset by the inherent tendency of the porous material to promote a laminar flow of the liquid and gas. Such laminar flow, if permitted, would detract from the contacting and intermingling of the fluids.

However, it has been found that this laminar flow-forming tendency of the wire mesh or other porous material may be effectively counteracted, and the effi;ciency of the contactor thus increased, by so forming the flow path through the contactor 10 as to define a series of comparatively sharp relatively-reversed bends or undulations. The resulting flow of the gas and liquid through such an undulating path results in turbulence which effectively counteracts the laminar flow tendency otherwise produced by the porous material. The means for defining such an undulating flow path may assume various forms; though in the preferred embodiment, this is accomplished by the provision of a series of upper and lower baffle plates 38 and 40 respectively, each extending partially across the contactor and the flow path, with the baffle plates 40 of the lower series alternating with the baffle plates 38 of the upper series so that the fluid moving through the contactor from the inlet end to the discharge end thereof must pass alternately first beneath the lower edge of an upper baffle plate 38 then upwardly over the upper edge of a lower baffle plate 40.

Further, it has been found that beneficial results may be secured by disposing the baffle plates 38 and 40 so that the undulations defined by them are in substantially a vertical plane. By this arrangement the action of gravity is utilized to retard the ascending liquid in its movement over the lower baffle plates 40, thereby exposing the liquid to prolonged contact with the gas.

It will be appreciated that the exact number, the relative spacing, and disposition of the desiccant inlet points or locations 16a, 16b, and 16c, as well as the number, location, and spacing of the respective saturated desiccant discharge locations, as exemplified by the drains 18a, 18b, and 18c, are subject to variation as required for varying operating conditions, such as differences in the moisture content of the gas, the volume and rate of flow thereof, and the exact nature and composition of the gases and liquids which are caused to interact within the contactor 10.

Generally speaking it is desirable to dispose each of the several saturated desiccant drains 18a and 18b just in advance of a lower baffle 40 and on the upstream side of said baffle from a liquid desiccant injection nozzle such as 32b or 32c, while the last such drain 18c is advantageously disposed just in advance of the last of the lower baffle plates 40 along the flow path.

In the operation of the invention, the mixture of gases, consisting for instance of petroleum gas and water vapor (and possibly certain amounts of free water) is delivered into the contactor 10 through the conduit 12 and nozzle 12a together with a continuous stream of lean liquid desiccant such as ethylene glycol, for passage of the gas along an undulating path passing alternatingly beneath and above the respective alternating baffles 38 and 40. The gas is contacted by and has the moisture removed therefrom by the liquid desiccant so that the dried gas, frequently with a certain amount of desiccant entrained therein, will be discharged from the contactor 10 through conduit 14 into the separator 20. In the separator 20, the entrained liquid will be removed and the gas in the dry form will be discharged through the conduit 24. The desiccant liquid will be urged through the same undulating path by the flowing gas. It will normally saturate the porous material or mesh 36 to provide for efficient gas and liquid contact. The action of the gas in urging the liquid over the lower baffles 40 will be opposed by gravity, thereby prolonging the gas-liquid contact; and, of course, the saturated liquid will gravitate to the bottom of the contactor for withdrawal at suitable intervals through the drains 18a, 18b, and 18c. This saturated liquid is delivered by the conduit 18 into the separator 20 for reception in the pool 22 at the separator bottom. It will then be conducted by conduit 26 to the regenerator 28. From the regenerator 28 the lean desiccant is withdrawn through the conduit 30 by the action of the pump 31 and conducted back into the inlet or delivery conduit 16 for injection through the inlet conduit branches 16a, 16b, and 16c. The liquid thus is caused to flow through a constant closed cycle and the efficiency of the apparatus has been found to be such that any loss of liquid over a comparatively long period of operation is so minimal as to be substantially negligible.

While the present application has been directed primarily to a description of the invention as employed in the drying of petroleum gas, it will find obvious utility in various fields requiring the intimate contacting and/or reacting of gases and liquids, and the separation of the resulting products. For instance, the contactor 10 may advantageously be employed for desulphurizing gas. In such event, the raw gas may be admitted through inlet 12 and the desulphurized gas withdrawn through outlet 14. A suitable desulphurizing liquid, such as a conventional amide, is admitted through the line 16 and its associated branches, to react with the sulphur-bearing component of the gas; and the liquid-reaction product is withdrawn through the drains 18a, 18b, and 18c.

Having thus described my invention I claim:

1. A gas and liquid contact apparatus, comprising a casing defining a generally horizontally-extending continuous fluid flow path having an inlet communicating with its interior adjacent one horizontal end of said flow path, means for introducing a mixture of gases into the casing through said inlet, a source of liquid of a type which is capable of absorbing at least one of the gases from said mixture but which is also substantially incapable of absorbing at least one of said gases from the mixture, means communicating with said source for delivering said liquid into the upper portion of said casing for injecting said liquid into the casing, a porous material of a chemically inert nature in the presence of said gas mixture and said liquid, said porous material occupying the interior of said casing along said flow path for reception of said injected liquid for creating an increased surface area of contact between said mixture of gases and the liquid, and for impeding the downward flow of the liquid in order to maintain the liquid in prolonged contact with the mixture of gases as the mixture moves along said flow path, said casing being formed with an outlet opening through its bottom for discharge of said liquid, said casing further being formed with a gas outlet above its bottom adjacent the other horizontal end of said flow path for discharge of gas, and a plurality of upper and lower baffle plates disposed in said casing in alternating relation along said flow path for defining a plurality of vertical undulations in the flow path to discourage the laminar flow of fluid through said porous material and to impede the downward flow of liquid through said material at locations along said flow path in which the said vertical undulations produce predominately upward flow of the said gases.

2. A gas and liquid contact apparatus as defined in claim 1, further including a plurality of supplemental liquid injection means each communicating with said source of liquid and opening into the upper portion of said casing at relatively-spaced locations along said flow path for injecting the liquid into the flow path and onto said porous material at each of said locations, and a plurality of supplemental liquid drains opening through the bottom of said casing at relatively-spaced locations along said flow path for removal of said liquid.

3. A gas and liquid contact apparatus as defined in claim 2, in which said mixture of gases is a petroleum gas containing water vapor, and in which said liquid source is a source of a desiccant liquid capable of absorbing said water vapor from the petroleum gas.

4. A gas and liquid contact apparatus as defined in claim 2, in which each of said liquid drain openings is located downstream along said flow path from a liquid injecting means and adjacent the base of one of said lower baffle plates on the upstream side thereof along the flow path, each said last-mentioned lower baffle plate being interposed between relatively-adjoining liquid injecting means.

References Cited
UNITED STATES PATENTS

| | | | |
|---|---|---|---|
| 1,373,892 | 4/1921 | Kimbul | 261—96 |
| 2,615,699 | 10/1952 | Dixon. | |
| 2,946,726 | 7/1960 | Markels | 261—97 X |
| 2,990,910 | 7/1961 | Kimmell | 55—32 |

FOREIGN PATENTS 516,439  12/1920  France.

OTHER REFERENCES

Matex Mist Eliminators; Metal Textile Corporation; Roselle, N. J.; 7 pages.

HARRY B. THORNTON, *Primary Examiner.*

RONALD R. WEAVER, *Assistant Examiner.*